Inventors.
Uno Lamm,
Åke Karsberg.
per Attorney

June 18, 1940.  U. LAMM ET AL  2,204,805
MEANS FOR FORCED COMMUTATION OF CURRENT RECTIFIERS OR CONVERTERS
Filed Feb. 26, 1938   2 Sheets-Sheet 2
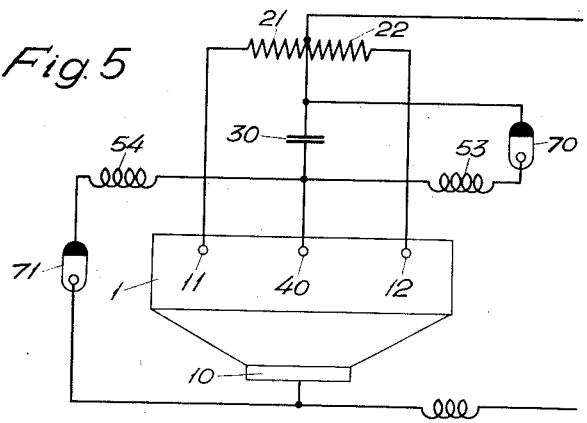
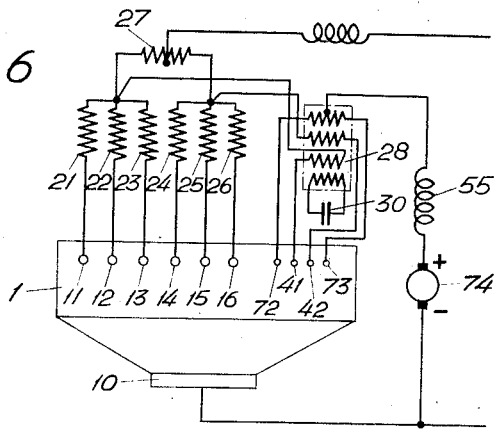
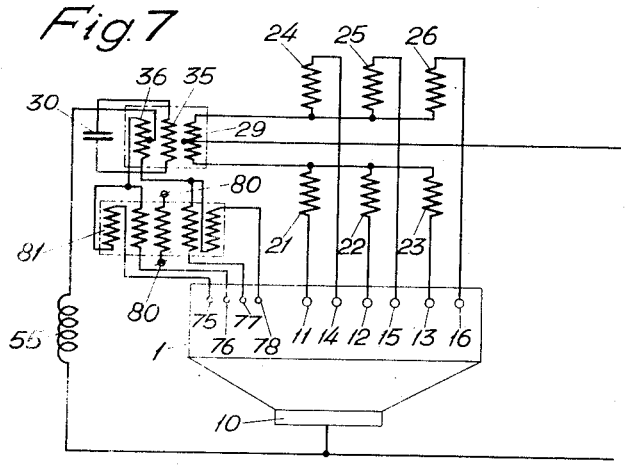
Inventors.
Uno Lamm.
Åke Karsberg.
per ........ Attorney.

Patented June 18, 1940

2,204,805

UNITED STATES PATENT OFFICE 2,204,805

MEANS FOR FORCED COMMUTATION OF CURRENT RECTIFIERS OR CONVERTERS

Uno Lamm and Åke Karsberg, Ludvika, Sweden, assignors to Allmänna Svenska Elektriska Aktiebolaget, Vasteras, Sweden, a corporation of Sweden Application February 26, 1938, Serial No. 192,739
In Sweden February 27, 1937

7 Claims. (Cl. 175—363)

It is known that a forced commutation of current rectifiers or converters can be obtained by connecting between the active anode and the anode next in turn to be active a source of voltage which raises the potential of the latter anode above that of the former, and it is also known to employ a condenser as such a source of voltage. The current to be furnished to the anodes by this condenser varies substantially proportionally to the load of the rectifier or converter, and if no special steps are taken for an equalisation, the voltage of the condenser will therefore also vary substantially in proportion to this load. This is as a rule not desirable, and the present invention therefore provides such a connection of the commutating condenser that it will give a commutating voltage, which is essentially independent of the load. Several forms of the invention are diagrammatically illustrated in the accompanying drawings in Figs. 1–7.

Figure 1:
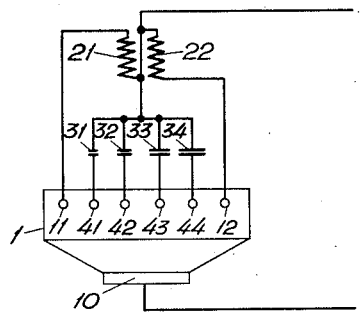

In all the forms illustrated, 1 designates the valve vessel of the rectifier or converter and 10 its cathode. 2 designates the main transformer. In Fig. 1, the valve vessel has two main anodes 11, 12 each of which is intended to be active during a semi-cycle and is connected to one half 21, 22 of a transformer winding cooperating with a non-illustrated single-phase winding connected to the line (primary in rectifiers, secondary in inverters). The means generally necessary in connection with forced commutation for blocking the anodes during certain periods, as grids or the like, are not shown in the drawings, as the invention is not concerned with their construction and the method of operating them.

It is known to connect to the neutral point between the two winding halves 21, 22 a so-called transition anode, which is actuated in a certain manner in order to force the commutation between the two main anodes, and which in valve vessels having several anodes may be placed in the same vessel as the main anodes, but which also may be arranged in a separate valve vessel. It is also known to connect a condenser between the neutral point and the transition anode for impressing a voltage on the transition anode at the appropriate instants. The current over the transition anode shall be equal to the main current, and its duration shall be essentially independent of the load. In order to make the charging voltage of the condenser comparatively independent of the load in spite of the aforesaid circumstances, several condensers 31, 32, 33, 34 are in Fig. 1 connected in parallel and discharge each over one transition anode 41, 42, 43, 44, a larger or smaller number of transition anodes being released according to the variations of the load. The capacities of the condensers may be chosen in a certain proportion, for instance as the weights in a set of weights or in the proportion 1:2:4:8 etc., whereby a fine regulation can be obtained within wide limits with a comparatively small number.

Figure 2:
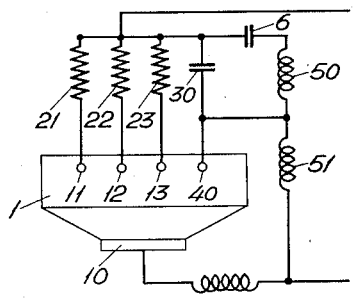

Fig. 2 shows a rectifier or converter having three main anodes 11, 12, 13 and a three-phase transformer winding 21, 22, 23. A common transition anode 40 serves for all the commutation processes. The voltage source for this transition anode consists of a condenser 30, which in a manner known in principle operates in parallel with an inductance 50. As distinguished from arrangements hitherto proposed in which the inductance should be so large as to keep the condenser current practically constant during the time of charging and discharging, the inductance 50 should here be so small as to be in resonance with the condenser for the operating frequency of the transition anode ("frequency of commutation") or with a multiple thereof, and this in spite of the condenser being so large as to be able to furnish, with a permissible voltage drop, a considerably larger quantity of electricity than that required for the commutation of the highest permissible current. The surplus quantity of electricity oscillates between the condenser and the inductance 50 so as to charge the condenser essentially to the same voltage independently of the quantity of electricity consumed by the transition anode, which depends on the load. It may be advisable to connect the lower terminal of the condenser 30 with the cathode side over a large inductance 51 and simultaneously to insert in the oscillating circuit a blocking condenser 6, which prevents a direct current from passing through the inductances, but which has so large a capacity as not to influence appreciably the resonance oscillations. In this manner, the lower terminal of the condenser obtains a mean potential adjacent to that of the cathode, which has been found advantageous for the right procedure of charging and discharging, as the main voltage between the condenser terminals becomes substantially equal to the direct current voltage of the rectifier or converter.

Figure 3:
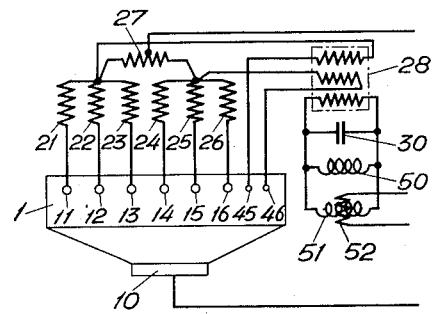

In Fig. 3, the connection of the converter is of the type generally referred to as double three-phase with six main anodes 11—16, two three-phase transformer stars 21—23 and 24—26 and an interphase transformer 27 connected between the neutral points of said stars. Two transition anodes 45, 46 are arranged one for each three-phase star. These transition anodes are fed from a resonance circuit 30, 50, 51 of essentially the same properties as those described in Fig. 2, although the inductance is divided into one constant portion 50 and one portion 51 connected in parallel thereto and capable of regulation by means of a saturating direct current winding 52. The latter winding may be traversed by a current forming the difference between a constant current and the load current or a current proportional thereto so as to raise the total inductance in the oscillating circuit at a raising load and thereby counteract the tendency to raise the frequency, which is a consequence of the increased damping. The feeding of the transition anodes from the resonance circuit is effected over a transformer 28 having three windings. In this case no blocking condenser is necessary.

Figure 4:
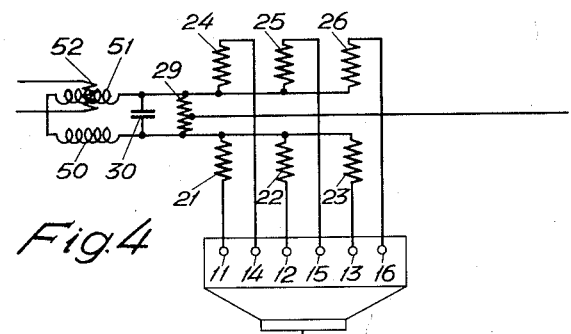

Fig. 4 shows a six-phase current converter with six anodes 11—16, transformer windings 21—26 and a voltage divider 29 connected between two three-phase neutral points, said divider, however, not serving to divide the current, as the commutation always takes place from one star to the other. In this form, there are no transition anodes, but the forced commutation is effected directly by means of additional voltages introduced between the two neutrals from a resonance circuit consisting of a condenser 30, one constant inductance 50 and one adjustable inductance 51. The adjustment of the latter can be made by a winding 52 in the same manner as in Fig. 3. The two inductances are here connected in series.

In Figs. 5 and 6, there are again used transition anodes. Fig. 5 shows a current converter having two main anodes 11, 12, one transition anode 40 and a single-phase transformer the winding parts of which are designated by 21 and 22. The condenser 30 for feeding the transition anode has a second discharging circuit containing an inductance 53 and a separate valve path 70 blocking it after discharge. This discharging circuit enters into function as soon as the current through the transition anode does not reach its maximum value. The discharging is then effected over an inductance 54 and another valve path 71, the anode of which is connected to the cathode of the main valve vessel. With exactly the connection illustrated, this converter is particularly suitable for operating with a voltage regulated down to a very low value, for instance as a phase compensator on an alternating current network with the direct current side short-circuited, but if the anode of the valve path 71 is connected to a point having another potential, for instance produced by means of an auxiliary rectifier, this form may operate satisfactorily at any direct current voltage.

Fig. 6 shows a connection essentially analogous to that of Fig. 5 although with the modification that the condenser 30 is connected over a transformer to two transition anodes 41, 42 and to two auxiliary valve paths for the supplementary discharging, whereby it has been made possible to incorporate the said two valve paths in the main vessel using anodes 72, 73. Otherwise the main converter has six anodes and three phases, using an interphase transformer 27 and analogous to Fig. 3. The auxiliary valve paths 72, 73 for the supplementary discharge are connected each to one end of a winding of the transformer 28, the neutral point of said winding being connected to the cathode over a direct current voltage source 74 and an inductance 55. The direct current voltage source is necessary only at low load. At a comparatively high load it is always possible, after the corresponding auxiliary anode 72 or 73 has ceased to carry current after substantially charging the condenser 30, to cause the transition anode to continue to carry current sufficiently long for effecting the overcharging, which is necessary to cover the losses in the corresponding circuits. At a very low load, the current in the transition anode may be insufficient for this purpose, and it may therefore be necessary to increase the active time of the anode 72, 73 by introducing the direct current voltage source 74. The anodes 72, 73 operate in conjunction with this voltage source as an inverter, but they may also be fed by an alternating current source and thus act as a frequency converter. Such a modification is shown in Fig. 7, which also, as compared with Fig. 6, illustrates the modification independent of the just mentioned one, that the indirect commutation over a transition anode path is replaced by a direct forced commutation.

The current converter in Fig. 7 has six anodes and the corresponding transformer windings divided into two three-phase groups 21—23 and 24—26 connected together by a transformer winding 29 dividing the voltage but not the current, as the winding 29 serves to introduce the additional voltages effecting the commutation from one three-phase star to the other so as to cause the converter to act as a six-phase one. These voltages are obtained from the condenser 30 which is charged and discharged over the transformer windings 35, 36 and the auxiliary anodes 75—78. The primary source of this charging and discharging consists of an alternating current from the terminals 80, which is converted to the proper frequency of the condenser circuit over the anodes 75—78 and the transformer 81. Hereby the losses in the oscillating circuit as well as the energy consumption of the winding 29 are covered. The operation may perhaps be explained in the most simple manner thus, that the voltage of the rectifier formed by the transformer 81 and the anodes 75—78 is added to the voltage on the terminals of the transformer winding 36 connected to the inductance 55 and thereby giving the same result as the direct current voltage source 74 in Fig. 6, which raises the voltage on the neutral point of the corresponding winding, said result being to prolong the active time of the occasionally active anode so much as is necessary for charging the condenser 30 to full voltage.

We claim as our invention:

1. In current converting valve apparatus a plurality of main valve paths, a plurality of transitional valve paths connected in parallel to each other and to said main valve paths and conducting the current only for commutation between said main valve paths, and one separate condenser connected in series with each of said transitional valve paths.

2. In current converting valve apparatus, a plurality of main valve paths, a plurality of transitional valve paths connected in parallel to each other and to said main valve paths and conducting the current only for commutation between said main valve paths, and condensers of different capacity connected one in series with each of said transitional valve paths.

3. In current converting valve apparatus, a plurality of valve paths, a condenser impressing a voltage between certain of said valve paths to transfer the current from one valve path to another, and a current path connected in series with the condenser and in parallel with and operating simultaneously with the valve paths fed thereby, said current path containing an inductance which is in resonance with the condenser for the commutating frequency of the converting apparatus or for a multiple thereof.

4. In current converting valve apparatus, a plurality of valve paths, a condenser impressing a voltage between certain of said valve paths to transfer the current from one valve path to another, a current path connected in series with the condenser and in parallel with the valve paths fed thereby, an inductance contained in said current path and which is in resonance with the condenser for the commutating frequency of the converting apparatus or for a multiple thereof, a further condenser also contained in said current path and having a capacity considerably larger than the aforesaid one so as to not materially affect the resonance frequency, and, also contained in said current path, a connection, containing a large inductance, between said resonance current path and the cathode terminal of the valve apparatus.

5. In current converting valve apparatus, a plurality of valve paths, a condenser impressing a voltage between certain of said valve paths to transfer the current from one valve path to another, and a current path connected in series with the condenser and in parallel with the valve paths fed thereby, said current path containing an inductance having a saturating direct current winding for adjusting to a proper resonance frequency with the condenser.

6. In current converting valve apparatus, a plurality of valve paths traversed by the main load current, a condenser impressing a voltage between certain of said valve paths to transfer the current from one valve path to another, and one or more load circuits for said condenser containing controlled valve paths connected in parallel and operating simultaneously with the paths traversed by the main load current.

7. In current converting valve apparatus, a plurality of valve paths traversed by the main load current, a condenser impressing a voltage between certain of said valve paths to transfer the current from one valve path to another, one or more additional load circuits for said condenser connected in parallel and operating simultaneously with the paths traversed by the main load currents, controlled valve paths in said additional load circuits, and voltage sources in series with said controlled valve paths modifying their mean potential relatively to their cathode potential.

UNO LAMM.
ÅKE KARSBERG.